June 7, 1966  L. A. COBB ETAL  3,255,347
SYSTEM FOR DETERMINING FLUID FLOW RATE IN BOREHOLES
Filed Nov. 20, 1962
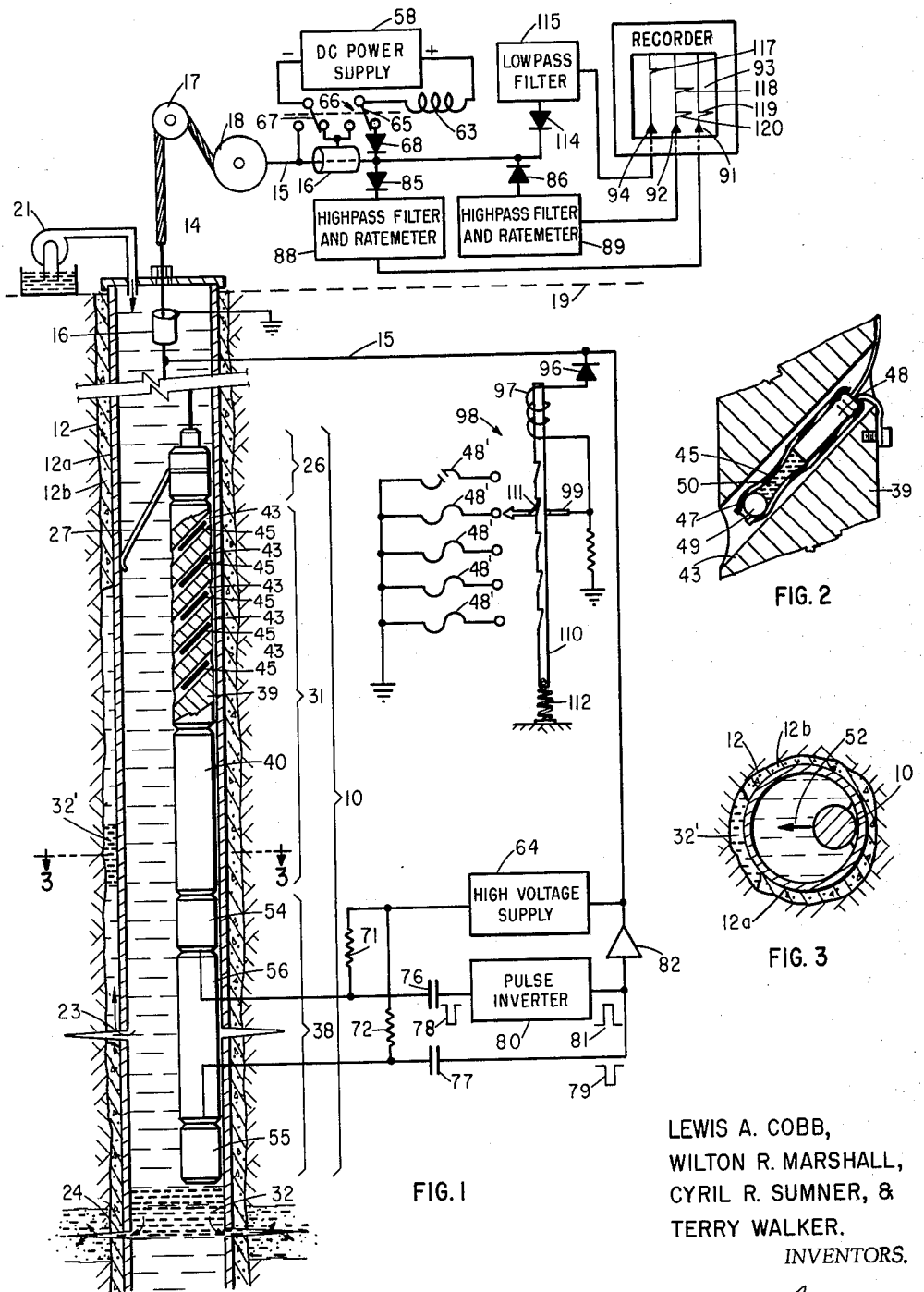
LEWIS A. COBB,
WILTON R. MARSHALL,
CYRIL R. SUMNER, &
TERRY WALKER.
INVENTORS.
BY Robert J. Peter
ATTORNEY.

United States Patent Office 3,255,347
Patented June 7, 1966

3,255,347
SYSTEM FOR DETERMINING FLUID FLOW RATE IN BOREHOLES
Lewis A. Cobb, Portland, and Wilton R. Marshall, Cyril R. Sumner, and Terry Walker, Houston, Tex., assignors to Halliburton Company, Duncan, Okla., a corporation of Delaware
Filed Nov. 20, 1962, Ser. No. 239,028
13 Claims. (Cl. 250—43.5)

The present invention relates to the determination of fluid flow in and about boreholes traversing an earth formation and, more particularly, to a system and method for making such a determination with improved accuracy.

Such a system and method is useful in that the flow determination provides diagnostic data of great value in taking actions which will effect well operations, such as, reworking, abandonment and water flooding.

One general prior art technique for making such determinations relies on the establishment of a detectable interface by injecting a slug of tracer material within the fluid of the well bore and then observing the movement of the slug as it is conveyed by borehole fluid flow.

This general technique includes first and second methods wherein the first is characterized by operation such that the movements of the slug are tracked by a moving detection tool whose movements, in turn, are assumed to be representative of borehole fluid flow speed. The second method is carried out by positioning a plurality of space detectors along a borehole section of interest for detection of a tracer slug as it is conveyed past each of the space detectors by borehole fluid flow. If the time interval of passing is noted, a notion of fluid flow speed and direction may be had under certain conditions.

The accuracy of the determination obtainable by either method is an inverse function of the longitudinal extent of the slug in the borehole, and is a direct function of the sharpness or definition of its interfaces with respect to uncontaminated borehole fluid. Prior art means or modes of injection of the tracer material into the borehole fluid have produced slugs of undesirably long length characterized by indistinct, unsharp interfaces. Such slugs produce such ill defined detector indications as to substantially reduce the accuracy and vertical resolving power of both methods; sometimes to the point of rendering their utility a questionable matter.

In the case of the first method, the necessary movement of the detector relative to the borehole generates added turbulence which further mixes the slug with borehole fluids. This additional mixing has the effect of elongating the slug as well as rendering its interfaces even more indistinct. For this reason, the second method, which does not introduce this added mixing effect, is inherently more likely to produce accurate determinations. However, it will be readily appreciated that even in the case of the first method, a slug which is initially of short extent and distinct boundaries, even though exposed to a given amount of mixing turbulence as it is conveyed, will continue to be capable of producing more accurate determinations than a slug that is initially longer with ill defined boundaries and exposed to the same given amount of mixing turbulence.

Although the present invention, in part, aims to improve the general technique of flow determinations by providing a new short slug having improved interface characteristics, the potential of the new slug is utilized with greatest effect in connection with second method wherein its improved characteristics are less likely to be lost as the slug is conveyed. Prior art systems and methods for making the desired determinations in accordance with the second method have the further shortcomings in common which operate to further degrade the accuracy of the method. This shortcoming arises from the ambiguous transmission and recording of detector outputs and results in recorded data which is incapable of scientific interpretation. In other words, evaluation of the same set of data by different persons would produce different conclusions. The present invention aims to improve this state of affairs by providing a new and improved system and method for making flow determinations characterized by a new degree of accuracy and reliability as compared to the results obtainable with prior art systems and methods.

Accordingly, it is a principal object of this invention to provide a new and improved wireline logging system and method for making borehole fluid flow determinations.

Another object of the invention is the provision of an improved tracer material carrier and ejector means adapted to eject the tracer material with a high degree of directivity.

Still another object of the invention is the provision of an improved tracer material carrier and ejector means adapted to eject the tracer material in a predetermined direction with respect to the borehole axis.

A further object of the invention is the provision of improved fluid flow determination apparatus provided with means for minimizing fluid flow tubulence occasioned by borehole fluids flowing past the apparatus.

Still a further object of the invention is the provision of an improved borehole fluid flow determination system, as well as an improved method characterized by the distinctive transmission and recording of tracer material detection signals.

Another object of the invention is the provision of an improved tracer material carrier and ejector means having improved safety characteristics which particularly adapt the same to the safe handling of radioactive materials.

Other and further objects of the invention will be obvious upon an understanding of the illustrative embodiment about to be described or will be indicated in the appended claims, and various advantages not referred to herein will occur to one skilled in the art upon the employment of the invention in practice.

A preferred embodiment of the invention has been chosen for purposes of illustration and description. The preferred embodiment is not intended to be exhaustive nor to limit the invention to the precise form disclosed. It is chosen and described in order to best explain the principles of the invention and their application in practical use to thereby enable others skilled in the art to best utilize the invention in various embodiments and modifications as are best adapted to the particular use contemplated.

In the accompanying drawings:
FIGURE 1 is a schematic illustration of a wireline borehole fluid flow determination system embodying the features of the present invention and showing the downhole device of the system in an operating disposition;
FIGURE 2 is a partial sectional view of the downhole device of FIGURE 1 showing an ejector unit thereof in greater detail; and
FIGURE 3 is a sectional view of the borehole apparatus and borehole taken along line 3—3 of FIGURE 1.

Described generally, the borehole fluid flow determining system embodying the present invention, as shown in FIG. 1, comprises a downhole device, generally indicated as 10, suspended from the earth's surface within a borehole 12 by means of a wire line 14 (including a central conduction path 15 and an outer sheath 16) from sheave 17 and winch 18, necessary surface control and recording equipment (schematically shown above dashed line 19 in FIG. 1) and electronic equipment normally incorporated in the downhole device 10 but, for purposes of clarity of illustration, is shown schematically to the right of the borehole 12.

The system of the invention is shown in FIG. 1 employed in connection with the making of a fluid injectivity type borehole fluid flow study. This type of study is useful in casing leak and leak location detection, obtaining injectivity profiles for evaluating the efficiency of water flood projects, and in the detection of interzone channelling within the cement about the well casing, as examples. The general technique of this type of study is generally taught in United States Patent No. 2,617,941, issued November 11, 1952, to Craggs.

In the fluid injectivity type study, fluid flow and pressure is induced in the borehole casing 12a by injecting fluid (either a liquid or a gas) at a given rate by means of a pump 21 at the well head. Of course, incompressible well fluid must escape from the casing 12a at the same rate as fluid is injected. The points of escape are usually completion perforations, such as 23 and 24, although any opening or leak in the casing can provide an escape point to produce a fluid movement within the well bore.

Although the system is illustrated as it would be employed in the making of a fluid injectivity study, it will be apparent that the system of the invention may be employed for purposes of making accurate studies of well bore fluid flow which is due to fluid entry into the bore from the surrounding formations by merely inverting the ejector and detector portions of the downhole device 10 with respect to the borehole, the decentralizer portion and the wireline. Such fluid entry studies can be of great value in remedial work such as seeking to improve the ratio of oil to salt water production.

With further reference to the drawings, the downhole device 10 of the system of the invention is shown in FIG. 1 to be comprised of functionally separable portions 26, 31 and 38. These portions beginning at the top end of the device 10, are decentralizer portion 26, tracer carrier and ejector portion 31, and tracer detector portion 38. These portions, in generally dividing the device 10, will be employed as a convenience in presenting the description of the construction and operation of the downhole device 10 of the system of the invention.

*Decentralizer portion*

The decentralizer portion 26 has as its function the decentralization and orientation of the downhole device 10 with respect to the borehole axis. This portion is provided at its upper end with a cable connector suitable for attachment to the wireline 14. Its lower portion is enlarged to provide an attachment base for an actual decentralizing member 27. The decentralizing member 27 extends laterally of portion 26 and resiliently engages the wall of the well bore casing 12a and operates to displace the portion 26, together with the other portions of device 10, into engagement with the opposite wall of the well bore casing. The disposition of the downhole device 10 as displaced and oriented in the borehole is best seen in FIG. 3.

The member 27 is preferably constructed such that it may be resiliently forced into coextensive engagement with the device 10 in order that the device may be passed through tubing strings only slightly larger than its own diameter. Although the member 27 is resiliently movable with respect to the body of device 10 in the plane of the paper in FIG. 1, it is substantially fixed with respect to other movement so that it effectively and definitely establishes a radial plane of orientation for the downhole device which passes through the borehole axis at all times.

While the rather simple, and hence trouble free, decentralizer and orienter means shown is to be preferred, it will be apparent that other means, such as magnets, may be employed to displace the device 10 toward one side of the casing and orient it with respect to the borehole axis.

Fluid turbulence is generally objectionable in tracer logging systems in that it causes continual mixing of the tracer material with borehole fluid as the tracer slug is conveyed and tends to string out and destroy the original definition and shape of the slug as established within the borehole. This loss of definition and shape tends to reduce accuracy and vertical resolving power obtainable with any tracer logging system. For this reason, it is highly desirable that turbulence be minimized in the fluid flowing past the downhole device 10.

For this reason, among others, the downhole device 10 of the present invention is maintained in a stationary position with respect to the borehole wall while a tracer slug is traversing the length of the borehole coextensive with the device. This reduces or eliminates fluid turbulence due to the stirring action of movements of the device 10 relative to the borehole.

Some turbulence is unavoidably induced in the borehole fluid as it passes the downhole device because the presence of the device reduces the flow area and forces an increase in fluid velocity. However, the fluid turbulence effect due to the presence of the device is minimized in the present system by the decentralized disposition of the device 10 with respect to the borehole 12. As shown in FIG. 3, the present system with decentralization provides a crescent-shaped flow area. This shape provides a maximized hydraulic radius for the net flow area and reduces friction losses and fluid turbulence appreciably as compared to the same net flow area defined by other arrangements of the given borehole and downhole device. For example, if the downhole device were centralized within the borehole, the effective hydraulic radius would be less and the friction losses and turbulence appreciably more.

*Tracer carrier and ejector portion*

As may be seen in FIG. 1, the tracer carrier and ejector portion 31 is fastened to the lower end of the decentralizer portion 26 in fixed relation to the radial plane of orientation established thereby. The function of the carrier and ejector portion is to place a desired quantity of tracer material into, and locally mix the same with, the fluid of the borehole to provide a slug 32 of tracer tagged fluid of highly distinctive character. The tracer carrier and ejector portion 31 includes, at its upper end, a shooter section 39, and at its lower end, a spacer sub 40 which spaces the shooter from the detector portion of the device 10.

Shooter section 39 is a generally cylindrical member provided with a plurality of transversely extending passageways 43 which have their centerlines lying within a common radial plane in fixed relation to the radial plane of orientation of the device 10.

As shown in FIG. 1, the passageways 43 are parallel with one another and longitudinally spaced along the shooter section. Also it will be noted that each passageway is further disposed at an angle with respect to the centerline of the shooter section.

Each passageway 43 provides a receptacle receiving an ejector unit 45. The construction of the ejector unit 45 may be best seen in FIG. 2 which shows the ejector unit as it is disposed within a passageway 43 in greater detail. The ejector unit 45 is comprised of a tubular housing 47 which is plugged and sealed at one end by means of an electrically ignitable explosive member 48 which may be of any suitable well-known type, such as a squib. At its other end, the housing is sealed by means of a closure 49 to define a chamber for tracer material 50 within the housing intermediate the explosive member and the closure.

As shown, the housing 47 may be comprised of a rubber or other tube having resilient qualities and of a size such that when the somewhat larger closure 49 is inserted therein, the housing is elastically distended and a fluid tight sealing engagement arises from elastic or resilient forces set up within the material of the housing. A glass bead has been found to be highly suited as a closure.

Although the illustrative embodiment shows the housing member to be quite elastic and the closure quite rigid, it will be apparent that a somewhat rigid housing may be employed provided closure 49 has sufficient elastic distortability to provide the resilient forces necessary to provide the fluid tight seal. For example, a metallic tubular housing member may be satisfactorily sealed by means of a small rubber ball, normally somewhat larger than the bore of the tube.

The explosive member 48 may be sealed and fastened with respect to the tubular housing 47 by means of glue, for example. Other suitable means may be alternatively or additively employed. The explosive member 48 forms the breech end of the ejector unit.

The ejector units 45 are disposed within the passageways 43 with their closure or muzzle ends directed downwardly, as shown in FIG. 2. It is to be noted that fluid flow is also directed downwardly in the illustrations. In this downwardly directed disposition, when the ejector units are individually fired under control from the earth's surface in a manner to be described hereinafter, the explosive member will operate to expel both the closure 49 as well as the tracer material 50 contained therebehind into the borehole with a high degree of directivity such as might be obtained by a gun. The tracer material is ejected from the unit 45 with respect to the crescent-shaped net fluid flow area of the borehole such that the material has a velocity component parallel to the flow direction, as well as a velocity component (vector 52 in FIG. 3) in the direction of the axis of symmetry of the flow area. The direction of the vector 52 is, of course, established by the decentralization and orientation previously described.

The tracer carrier and ejector portion 31 of the device 10, in performing tracer material ejections with great precision (as to amount of material ejected, its direction, its placement with respect to the flow area in the borehole, as well as the force of ejection) establishes a tracer slug 32 of well defined character in the borehole fluid. Further, in any given borehole and fluid, the carrier and ejector portion 31 is capable of repetitively establishing other tracer slugs of substantially identical character upon signal from the earth's surface (so long as an ejector unit 45 of the plurality remains unfired). This capability, together with the close-coupled sharpness of the tracer slugs produced, promotes a high degree of accuracy in flow determinations made with the present system. The ability of the system to repeat and confirm a previously made determination greatly surpasses that of prior art systems.

The tracer slug 32 was established by the firing of the ejector unit housed in the upper-most passageway 43 of the device 10 and is shown having traversed the remaining extent of the downhole device 10 under the influence of fluid flow induced in the borehole by means of fluid injection from the pump 21. As has been previously brought out, an incompressible fluid, such as illustrated, must escape from the casing at this same rate. Perforations 23 and 24 provide escape points in the illustration. As the slug 32 was conveyed past the perforations 23, a portion 32' of the slug 32 escaped therethrough and reversed its direction to flow in an upward direction within a channel or holiday extending upwardly within the cement 12b between the borehole 12 and the exterior of the casing 12a. The main body of the slug 32, of course, continued downwardly to the location shown where it continues to flow out through the perforations 24 and into the adjacent formation. The particular borehole situation illustrated in FIG. 1, wherein cement channelling and reversal of flow direction of a portion of the tracer slug occurs, presents a very real problem in practical borehole fluid flow determination. It is in connection with this type of situation that one important advantage of the present system is illustrated as will be hereinafter brought out.

*Tracer detector portion*

Tracer detector portion 38 is connected at its top end with the lower end of the spacer sub 40 of the tracer carrier and ejector portion 31. Tracer detector portion 38 is comprised of first and second tracer detector units 54 and 55, which are located respectively at the upper and lower end of the detector portion, and which are spaced apart a definite distance by an intervening spacer sub 56.

The particular detector elements employed in the detector units would, of course, be suited to detect whatever particular tracer material 50 which might be employed within the system. However, when the tracer material 50 is a short-lived soluble gamma emitter, as is preferred, the detector units 54 and 55 would preferably house gamma ray detectors such as GM counters (not shown), in order that a gamma ray emitting tracer slug such as 32 may be detected as it passes the units 54 and 55 in its traverse along the length of the downhole device.

*Control, detection, and recording*

A D.C. power supply 58, located in the earth's surface, is provided for supplying power to the downhole electronic equipment and for transmitting firing signals selectively to the various ejector units 43 to secure the operation thereof. The positive terminal of the power supply is normally connected to the path 15 of wireline 14 through a choke coil 63, a blade 65 of a DPDT (double pole double throw) switch 66, and a diode 68. The negative terminal of the power supply 58 is normally connected to the sheath 16 of the wireline through a blade 67 of the DPDT switch 66. Thus, the central conduction path 15 is normally positive with respect to the sheath 16. When the DPDT switch 66 is switched from its normal position, the polarity of the system is reversed, and such reversal constitutes an ejector unit firing signal as will appear.

The D.C. power of normal polarity supplied to the central conduction path 15 powers a downhole high voltage supply 64. The output of the high voltage supply is supplied to a GM counter (not shown) associated with each of detector units 54 and 55 via quenching resistors 71 and 72 respectively to place a positive potential on the central counter electrode to enable operation of the counters in detecting gamma radiation. The normal voltages applied to the central counter electrodes of detector units 54 and 55 are respectively blocked by capacitors 76 and 77 from communication to the central conduction path 15. However, when either of the GM tubes discharges in response to gamma radiation, the voltage drop in the quenching resistors associated therewith causes a negative-going voltage fluctuation and a negative pulse is communicated across the capacitor associated with that particular GM tube for coupling to the central conduction path 15 of the wireline.

The pulses 78 and 79 respectively arising from operation of detectors 54 and 55 are both negative. To give the pulses identity as having originated from the operation of a particular detector, the negative pulse 78 is fed to a pulse inverter 80 where it is converted to a positive pulse 81. The pulses 79 and 81 are then coupled to the central conduction path 15 via an amplifier 82 for transmission to the earth's surface.

At the surface, the pulses are separated by the diodes 85 and 86 respectively passing pulses 81 and 79 respectively into high pass filter and rate meters 88 and 89. The rate meters 88 and 89, which are set to distinguish the count rate or signal due to the passage of a radioactive slug count rates due to background radiation in the borehole, respectively supply voltages to recorder pens 91 and 92 in response to a tracer slug detection counting rate level. Thus, recorder pens 91 and 92 are actuated responsive to the passage of a tracer slug past detector units 54 and 55 respectively to provide a distinctive unambiguous indication on the time driven record 93 of the recorder.

As has been previously brought out, whenever it is desired that a tracer slug be established in a borehole, it is only necessary to operate the DPDT switch 66. When the polarity on the cable is reversed, a downhole circuit, normally maintained in an open non-conducting state by diode 96, is completed from power supply 58 through an operator coil 97 of a solenoid stepping switch 98, a stepping contact 99 thereof and through the bridge wire 48' associated with the explosive member 48 of a particular ejector unit 45 to accomplish the firing of the same.

The schematically illustrated stepping switch 98 is of the type which fires on energization, but which steps its contact 99 to connect the next bridge wire in the stepping sequence only after the circuit is subsequently opened. A preferred switch of this type is disclosed in commonly assigned Patent Number 3,116,689 of Cyril R. Sumner, granted January 7, 1964, for "Well Perforating Apparatus and Switch."

The schematically illustrated stepping switch 98 is shown in its post energization state subsequent to having fired the bridge wire 48' of the upper-most ejector unit 45. This firing, of course, established the tracer slug 32 shown as having traversed the length of the downhole device. The switch contact 99 has stepped to the bridge wire 48' of the second upper-most ejector unit and is ready to fire the same the next time the switch circuit is energized. When it is desired to establish a second slug 32 in the borehole, the polarity of the system is reversed to fire the second ejector unit. At this time, the coil 97 is energized to draw a stepping member 110 upwardly with respect to the stepping contact 99 and a ratchet spring 111 affixed thereto against the resistance of a stepping spring 112. When the polarity of the system is returned to normal, the switch circuit is again opened at diode 96 and the coil 97 is de-energized. This permits the stepping spring 112 to return the stepping member 110 to the positon shown, but this time carrying, by means of the ratchet spring 111, the stepping contact 99 to a next lower position.

When the polarity of the system is reversed to fire an ejector unit as just described, a second circuit is completed through a diode 114, a low pass filter 115 to actuate a third recording pen 94. The actuation of the pen 94 provides an indication on the record 93 of the time of firing of an ejector unit.

*Operation*

Because of restrictions on the transport of radioactive materials in combination with explosives, the ejector units 45 of the present system would normally be transported empty, and would be filled with radioactive material only after arrival at a job location. The housing 47 and the explosive member 48 of the ejector units 45 would desirably be in the preassembled form of a small open-ended container. This container, after arrival at a location, only needs to be filled with the radioactive material and then sealed by inserting the closure member 49. The ejector units 45 are preferably loaded with about 15 drops of a one milli-curie-per-ounce solution of iodine 131 in oil, water or volatile fluid, depending respectively, upon whether the borehole fluid is oil or water or gas. After the individual units are thus loaded, they are assembled into the shooter section 39 of the device 10; one in each passageway 43. The explosive member of each ejector unit would then be electrically connected by grounding one lead and connecting the other lead to a selected contact of the stepping switch 98. After the device 10 is thus loaded, it may then be lowered to the desired location in the borehole where the fluid flow is to be examined. The device will, of course, orient and decentralize itself automatically in the borehole through the influence of the decentralizer 27.

If a fluid injectivity survey, such as is illustrated in the situation shown in FIG. 1, is desired, the well would then be sealed about the wireline so that fluid pressure could be maintained therein. Fluid injection would then be commenced at a selected rate by means of pump 21. Although the pump is shown as one means of providing injection fluid under pressure, it will be apparent that any suitable source of fluid and pressure may be utilized, e.g., high pressure gas. Next, the recorder time drive would be started and power applied to wireline 14 with normal polarity as illustrated. When it is desired to establish a slug 32 in the borehole fluid, the polarity on the wireline is reversed and the circuit of stepping switch 98 is energized, as previously described, to fire the top-most ejector unit 45. The action of the ejector establishes the new compact and well defined tracer slug of the invention by injecting and locally mixing the small amount of radioactive material with adjacent borehole fluid. In FIG. 1, the slug 32 thus established, is shown as having traversed the length of the downhole device by being conveyed by borehole fluid flow established by the injection rate of pump 21.

When the polarity on the wireline is reversed to establish a slug in the borehole as just described, recorder pen 94 is electrically actuated to provide a time zero mark 117 on the record 93. As the slug 32 passes the first detector unit 54, the recorder pen 92 will be actuated responsive to the passing of the slug to place a second mark 118 on the record 93.

Assuming the lower-most point of fluid egress from the casing lies below the lower-most detector unit 55, fluid flow in the borehole continues to convey the slug 32 downwardly, as shown. The slug's passage past the second detector unit is detected thereby and results in the actuation of pen 91 to produce a third mark 119 on the record 93.

As has been previously brought out, in the situation shown in FIG. 1, borehole fluid is escaping from the casing via perforation 23 into a channel or holiday in the cement 12b and via perforation 24 into an adjacent permeable formation zone. As the slug 32 was conveyed past the perforation 23, a portion 32' of the slug was forced therethrough and, thence, upwardly within the channel. As the portion 32' of the slug proceeded upwardly in the channel past the first detector unit 54, the slug portion 32' was again detected and a fourth mark 120 was applied to the record 93 by the recorder pen 92. As may be seen, the marks 119 and 120 occurred at about the same point of time on the time base of the record 93. Had these outputs of the two detector units been recorded by a single recorder pen or in another ambiguous manner, the upward passage of the slug portion 32' would have been obscured and no positive indication of cement channeling would have been provided by the record. This is illustrative of the capability of the present system and method for detecting unusual and unexpected borehole flows. This improved capability arises, of course, from the distinctive manner in which the detection signals are transmitted and recorded by the present system which is effective to completely remove ambiguities from this type of measurement which have detracted to a great extent from the reliability of determinations made with prior art systems.

A complete, although somewhat gross or coarse, determination of fluid flow within the borehole may be obtained by locating the downhole device and measuring transit times in different locations and repeating the above procedure. The results, i.e., the time spans or transit times between the detector signals as ascertained from the record 93, of all the recordings may then be considered together to arrive at a complete accurate, although rather coarse, flow determination. These complete flow determinations, in being based on more accurate and reliable data, are so vastly improved in accuracy and reliability, as compared with determinations made from data provided by prior art systems that they amount to a difference in kind.

By starting a series of successive fluid flow determination procedures in a section where the flow rate past the downhole device is known (as where, for example, the flow rate is equal to the rate that fluid is flowing into the borehole and the velocity over the section is constant) and then relocating the device in overlapping steps or increments and measuring the transit time of fluid flow between the detectors at each location, fluid flow determinations may be made as detailed as desired, depending on the length of the steps or increments chosen. As will appear, this process renders the degree of detail obtainable independent of the fixed spacing between the detectors 54 and 55 of the downhole device which may be on the order of eight (8) feet in length.

In carrying out this process (with the present constant-rate example) the downhole device would first be located in the section of known flow rate and a first transit time obtained by measurement as previously described. A unit transit time (second/foot) would then be obtained by dividing the measured transit time by the fixed spacing of the detectors 54 and 55 in feet.

Next, the downhole device would be relocated vertically such that its fixed spacing is, in effect, divided into an overlap portion and an increment portion. The overlap portion extends over a portion of the borehole section defined by the fixed spacing in the initial location of the tool, and the increment portion extends beyond the overlap portion into a borehole section in which the transit time is unknown. The vertical movement in relocating the downhole device thus selectedly defines the extent of the two portions, i.e., the vertical displacement defines the length of the increment portion as well as its complementary overlap portion. A depth correlation is, of course, made with each measurement as is customary in wireline operating procedure.

A second flow determination procedure is carried out in this relocated position by again measuring the transit time of fluid flow past the fixed spacing. If this time differs from the first transit time measurement, a variation of fluid flow has occurred within the borehole increment defined by the increment portion. To evaluate this variation, the unit transit time is integrated or summed over the distance defined by the overlap portion to obtain an overlap transit time which is then compared with the travel time of the second determination, to ascertain the time difference therebetween, i.e., the transit time over the increment.

It will be appreciated that this process of determining borehole flow may be equally well applied in instances where the flow within the first section of the borehole, although not constant, is known in the sense that unit travel times over intervals of the section are known.

It will also be appreciated that the foregoing step-wise process of fluid flow determination may commence in a borehole segment in which the flows are unknown and proceed toward a segment of known flows and that subsequent steps of the process may be carried out by considering all the depth correlated transit time measurements at once after the completion of an entire borehole survey.

Also, it will be evident from the above that a fluid flow survey obtained through use of the above process may be as detailed as desired, depending solely on the length interval of the steps or increment portions chosen as distinguished from the fixed spacing between the detector units of the particular downhole device employed. These increments or steps may be as small as six inches in length or even smaller, if desired.

After the downhole survey job is completed, any remaining unfired charges may be fired to safely dispose of remaining radioactive materials in the well bore so that a clean decontaminated downhole device is brought to the surface. This feature is highly desired in that it promotes safety and facilitates the effective employment of the device, system, and method of the present invention.

Thus, it has been seen that the present invention provides a new and improved well logging system and method which enables flow determinations to be made with greater detail, accuracy, and reliability than heretofore attainable by means and methods of the prior art. It has further been seen that this new accuracy stems, in part, from the new and improved tracer ejection mode which is effective to establish a tracer tagged slug of improved character, as well as from other improvements provided by the system of the invention. It has also been seen that the new more accurate data enables reliable detailed determinations which, in turn, permit improved effectiveness in decision making as related to the reworking of oil wells, for example.

As various changes may be made in the form, construction, and arrangement of the elements herein disclosed without departing from the spirit and scope of the invention, and without sacrificing any of its advantages, it is to be understood that all matters herein are to be interpreted as illustrative and not in any limited sense.

What is claimed is:

1. In a logging system for measuring flow rates of fluids within a borehole wherein an elongated logging tool is adapted for suspension within the borehole by means of a wireline from the earth's surface and material is ejected from said tool into said fluids, said tool including a resilient housing member having a bore with an opening for receiving said material; said bore being inclined with respect to the axis of said tool; spaced apart detector means on said tool and below said bore; explosive means in sealed relation to said housing member closing the bore of the same at one end; a closure member of larger size than said opening inserted therein and resiliently distorting said housing member thereabout and giving rise to sealing forces between said closure member and said housing member to accomplish a fluid-tight seal; and said explosive means adapted, in response to signal communicated from the earth's surface, to eject said closure member and said material from said housing member into the borehole with gun-like directivity in a general downward direction and generally towards said detector means, said detector means functioning to detect the presence of said material ejected by said explosive means.

2. In a logging system for measuring flow rates within a borehole wherein an elongated logging tool is adapted for suspension within the borehole by means of a wireline from the earth's surface and material is ejected from said tool into said fluids, said tool including an impervious housing member having a bore and at least one opening; said bore being inclined with respect to the axis of said tool; spaced apart detector means on said tool and below said bore; explosive means in sealed relation to said housing member and closing said bore at one end; a closure member engaging said housing member and in blocking relation to said opening; one of said members being of resilient material and resiliently distorted by the other of said members in their engagement whereby a sealed relation obtains from resilient forces exerted therebetween; and said explosive means adapted, in response to a signal communicated from the earth's surface, to eject said closure means and said material into the borehole with gun-like directivity in a general downward direction and generally towards said detector means, said detector means functioning to detect the presence of said material ejected by said explosive means.

3. A system as set forth in claim 2 wherein said one of said members is said closure member.

4. A system as set forth in claim 2 wherein said one of said members is said housing member.

5. A system as set forth in claim 2 wherein said explosive means is an electrically ignitable device controllable from the earth's surface.

6. In a logging system for measuring flow rates of fluids within a borehole wherein an elongated logging tool is adapted for suspension within the borehole by means of a wireline from the earth's surface and material is ejected from said tool into said fluids, said tool including a housing member of impervious resilient material having a bore for receiving said material; said bore being inclined with respect to the axis of said tool; spaced apart detector means on said tool and below said bore; explosive means in sealed relation to said housing member and closing said bore at one end; said bore at its other end being sealed with respect to borehole fluid by mutually opposing forces exerted by the resilient material of said member in the vicinity of said other end; and said explosive means adapted, in response to signal communicated from the earth's surface, to overcome said mutually opposing forces and eject said material from said bore at high velocity as compared to any fluid flow velocity in said borehole and in a general downward direction and generally towards said detector means, said detector means functioning to detect the presence of said material ejected by said explosive means.

7. In a logging system for measuring flow rates of fluids within a borehole wherein an elongated logging tool is adapted for suspension within the borehole by means of a wireline from the earth's surface and material is ejected from said tool into said fluids, said tool having cylindrical portions; said tool being provided with a bore receptacle for said material extending transversely of said body and having its axis inclined with respect to a radial plane of the cylindrical portions of said tool; detector means on said tool and below said bore; a decentralizer means on said tool disposed to urge the same against the wall of the borehole and angularly orient the same such that said radial plane extends substantially diametrically through said borehole; and means associated with said bore for expelling said material into said fluids and generally downwardly towards said detector means in response to signal communicated to the same from the earth's surface over said wireline, said detector means functioning to detect the presence of said material expelled into said fluids by said expelling means.

8. A system as set forth in claim 7 including, in addition to the first-mentioned bore receptacle, a plurality of similar bore receptacles each having its axis inclined with respect to said radial plane for receiving additional quantities of said material; means associated with each bore receptacle of said plurality for expelling its associated quantity of material in response to surface signal; and means for applying a surface signal to each means for expelling in a predetermined sequence.

9. In a logging system for measuring flow rates of fluids within a borehole wherein an elongated logging tool is adapted for suspension within the borehole by means of a wireline from the earth's surface and material is ejected from said tool into said fluids, said tool including a housing of impervious material having a bore for receiving said material; said bore having its axis inclined with respect to the axis of said tool; detector means below said bore and on said tool; explosive means in sealed relation to said housing member and closing said bore at one end; said bore at its other end provided with a seal isolating said material from said borehole fluids; and said explosive means adapted, in response to signal communicated from the earth's surface, to destroy said seal and expel said material from said bore into said fluids at high velocity as compared to any fluid flow velocity within said column and in a general downward direction toward said detector means, said detector means functioning to detect the presence of said material ejected by said explosive means.

10. In a logging system for measuring flow rates of fluids within a borehole wherein an elongated logging tool is adapted for suspension within the borehole by means of a wireline from the earth's surface and tracer ejector means and radioactive detection means are mounted on said tool the improvement which resides in providing said tool at its upper end with a bore having its axis inclined with respect to the axis of said tool, providing said detection means in the form of a pair of spaced apart detectors each mounted on said tool and below said bore with said ejector means being mounted in said bore and including a tracer material and explosive means effective when detonated to propel said tracer material out of said bore in a general downward direction towards said detectors, said detectors functioning to detect the presence of said tracer material propelled by said explosive means.

11. The improvement set forth in claim 10, including providing the tool with decentralizer means for urging the tool against the wall of said borehole with the opening of said bore through which said material is ejected being in communication with said fluids.

12. In a system of the character described, an elongated logging tool, means on said tool for pressing one side of said tool against a borehole, detector means on said tool, bore means inclined with respect to the axis of said tool and terminating at an opening at a side of said tool opposite to said one side, and means on said tool for ejecting material through said opening in a direction extending generally towards said detector means, said detector means functioning to detect the presence of said material ejected by said ejecting means.

13. A system as set forth in claim 12, in which the last mentioned means includes an explosive charge.

References Cited by the Examiner

UNITED STATES PATENTS

| | | | |
|---|---|---|---|
| 2,453,456 | 11/1948 | Piety | 250—43.5 |
| 2,749,840 | 6/1956 | Babcock | 102—20 |
| 2,826,700 | 3/1958 | Hull | 250—43.5 |
| 2,989,631 | 6/1961 | Bohn | 250—43.5 |
| 2,999,936 | 9/1961 | Herzog et al. | 250—83.6 X |
| 3,054,938 | 9/1962 | Meddick | 102—20 |
| 3,116,419 | 12/1963 | Martin | 250—43.5 X |

RALPH G. NILSON, *Primary Examiner.*

A. R. BORCHELT, *Assistant Examiner.*